March 6, 1973   J. CHAMBERLAIN   3,719,042
FUEL INJECTION MEANS
Filed Aug. 4, 1970
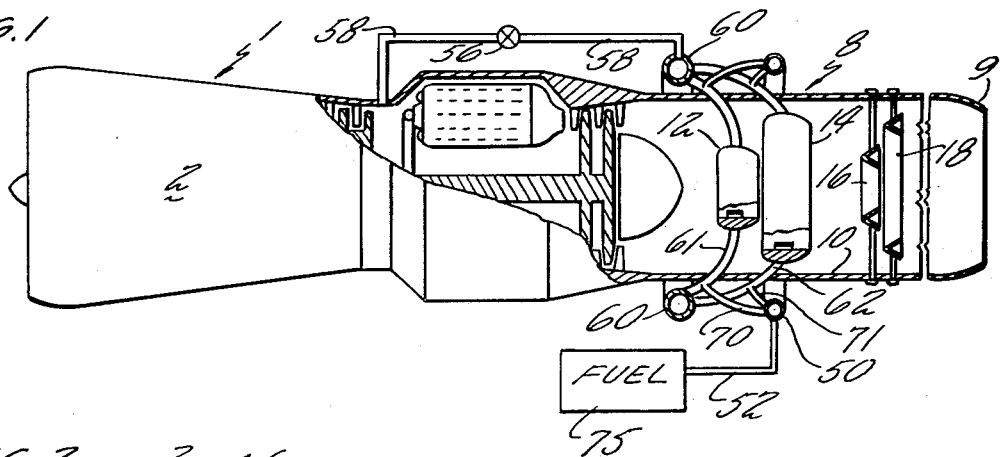
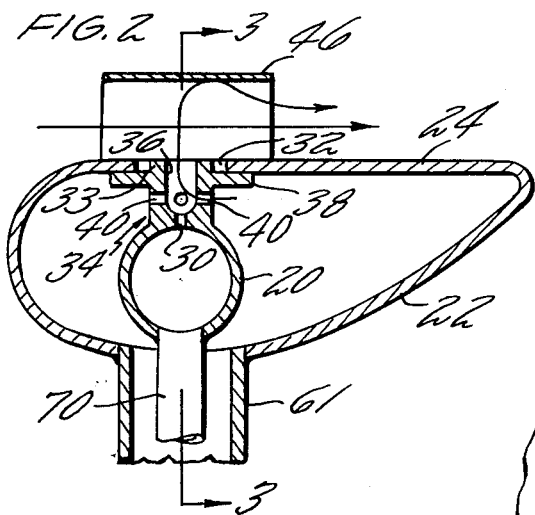
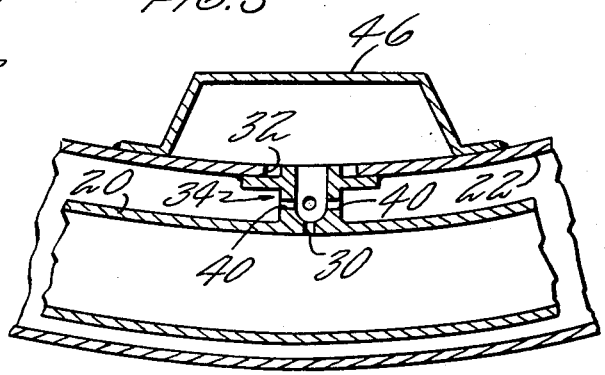
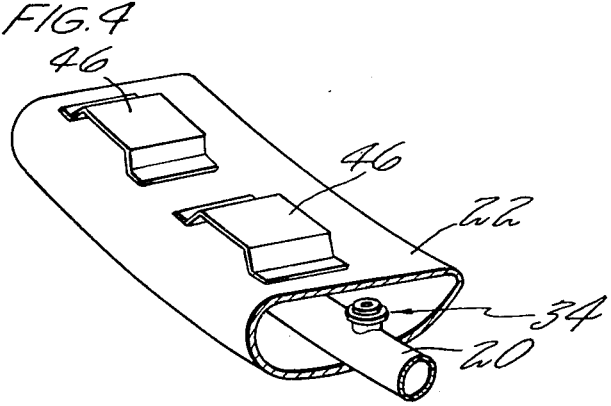
INVENTOR
JOHN CHAMBERLAIN
BY Jack N. McCarthy
AGENT «United States Patent Office»

3,719,042
Patented Mar. 6, 1973

3,719,042
FUEL INJECTION MEANS
John Chamberlain, Lake Park, Fla., assignor to United
Aircraft Corporation, East Hartford, Conn.
Filed Aug. 4, 1970, Ser. No. 60,824
Int. Cl. F02k *3/10;* F23r *1/04*
U.S. Cl. 60—39.74 R                             8 Claims

ABSTRACT OF THE DISCLOSURE

A fuel injecting means is disclosed wherein a dual injection manifold is positioned in a burner, said dual manifold having an annular inner fuel manifold within an outer air, or gas, manifold. Separate fuel and gas manifolds are located on the exterior of said burner and direct their respective flows to the proper manifold of the dual manifold by a plurality of pairs of conduits including a coaxial conduit section extending from the casing of the burner into the dual manifold. The inner conduit of said coaxial conduit being connected to the fuel manifold and the outer conduit being connected to the air, or gas, manifold. The inner manifold of said dual manifold having a plurality of openings each opening being axially aligned with an opening in the outer manifold so that the fuel and air, or gas, flow are directed through a common opening into the burner onto a splash plate. A splash plate is spaced from each opening on said outer manifold. In a modification a passageway is provided between each opening in the inner manifold and the edge of said wall portion of said second manifold.

BACKGROUND OF THE INVENTION

In many fuel injection systems a variable area orifice device is used. These are usually complicated and expensive. Splash plates are shown in U.S. Patent No. 3,269,115.

SUMMARY OF INVENTION

An object of this fuel injection means is to prevent hot fuel from boiling within a fuel injector, such as a spraybar, before it is injected within a burner. At the low end of a fuel flow range, the fuel pressure drop over spray orifices becomes very low, so therefore the fuel pressure in the spraybar becomes very low, and if the fuel is hot, it begins to boil. If the fuel does boil, the fuel flow becomes uneven and unsteady, which results in poor operation. This fuel injection means provides a gas pressure outside the spraybar which is above that of the surrounding air or gas. This raises the fuel pressure within the bar and prevents boiling within the bar, thus restoring good operation.

Another object of this invention is to surround the spraybar with a cooler gas such as compressor discharge air. This reduces the fuel temperature and tends to prevent fuel boiling within the spraybar.

Another object of the invention is to provide a dual injection manifold with a liquid fuel in the inner manifold and a gas in the outer manifold, said members having aligned openings so that the fuel and gas are injected into a burner through the same outer opening. A splash plate is provided to prevent excessive penetration of the fuel jet into the air flow and to improve fuel atomization.

BRIEF DESCRIPTION OF THE DRAWINGS

FIG. 1 is a view of a gas turbine engine showing the location of the burner and turbine of the main engine and showing the fuel supply means and flameholders for the afterburner.

FIG. 2 is an enlarged sectional view of a dual manifold.

FIG. 3 is a view taken along the line 3—3 of FIG. 2.

FIG. 4 is a perspective view showing a section of a dual manifold.

DESCRIPTION OF THE PREFERRED EMBODIMENT

Referring to FIG. 1, a gas turbine power plant is shown indicated generally by 1. The power plant has a compressor section 2, a combustion section 4, a turbine section 6 and an afterburner section 8. Said afterburner section 8 is shown having a fixed nozzle 9. The compressor section 2, combustion section 4 and turbine section 6 can be formed as any turbine engine. A conventional fuel supply and metering control (not shown) provides the desired fuel flow to the combustion section 4.

The afterburner section 8 comprises a casing 10 and the nozzle 9. Two dual manifolds 12 and 14 are mounted in the casing 10 upstream of conventional flameholders 16 and 18. Each dual manifold can be positioned by the means of struts extending radially inwardly to the outer side thereof.

Each dual manifold, 12 and 14 are formed by having a first annular manifold 20 positioned within a second manifold 22. The inner manifold 20 can be supported by any means desired such as arms extending out from the inner sides of the second manifold 22. The inner or first manifold 20 is connected so as to have fuel flow therein while the second or outer manifold 22 is arranged to have a gaseous flow therethrough such as air. It is to be noted that other gases can be used.

As shown in FIG. 2, the cross-section of the second manifold 22 is substantially air foil in shape with a flat wall portion 24 appearing at the inner circumference thereof. The first annual manifold 20 is positioned toward the forward end of the manifold 22 and has an opening 30 therein which is coaxially aligned with an opening 32 in the inner flat wall portion 24. While these two holes are coaxially located, they are in line with a splash plate 46 spaced radially inwardly from the hole 32.

The inner or first manifold 20 is positioned with respect to the outer or second manifold 22 by a plurality of bosses 34. Each boss 34 has a cylindrical outer surface and extends radially inwardly from each opening 30. An enlarged passageway 36, or chamber, therein extends from adjacent the end of the boss attached to the manifold 20 to the free end of the boss. This passageway 36 is connected to and axially aligned with its cooperating opening 30. The outer cylindrical surface of each boss has a cylindrical flange 38 spaced from the free end thereof leaving a section 33 extending on the end. Each section 33 projects into its cooperating hole 32 with the flange 38 engaging the inner surface of the flat wall portion 24. This properly positions the boss and permits some movement due to thermal changes. Openings 40 extend through the boss 34 and connect the passageway 36 to the interior of the outer second manifold 22. It is noted that openings 40 are provided with much more area than that of the opening of passageway 36 into the burner so that the area of passageway 36 into which the fuel from manifold 20 sprays will have a pressure approaching that of the gas in the manifold 22.

A fuel manifold 50 extends around the afterburner, and an air or gas manifold 60 extends around the afterburner and is located forwardly of the manifold 50. A plurality of conduits 61 connect the annular manifold 60 to the cooperating second manifold 22 of dual manifold 12 and a plurality of conduits 62 connect the annular manifold 60 to the cooperating second manifold 22 of dual manifold 14. Conduits 70 extend from the fuel manifold 50 to the interior of the conduit 61 at a point exterior to the afterburner and extends coaxially through the conduit 61 to the cooperating inner manifold 20. Conduit 71 extends from the fuel manifold 50 to the interior of the conduit 62 at a point exterior to the afterburner and extends coaxially through the conduit 62 to the cooperating inner manifold 20.

A fuel supply and control 75 has its controlled flow directed to the fuel manifold 50 through a conduit 52. Conduit 60 has compressed air directed thereto from the compressor outlet through a conduit 58 which has valve control means 56 therein. Controls can be provided which will coordinate the flow of fuel and gas to the dual manifolds 12 and 14.

While bosses 34 are shown positioning the inner manifolds 20, radially extending arms can be used with the openings 30 of the inner manifolds being made coaxial with a properly sized hole in the wall 24 of the cooperating second manifold. A splash plate 46 will be spaced from the hole in the wall 24 as it was previously for the passageway 36.

I claim:

1. In combination, a burner, fuel injection means in said burner, said fuel injection means including a dual manifold, said dual manifold comprising an outer duct means and an inner duct means therein, said inner duct means having a liquid fuel directed thereto, said outer duct means having a gas directed thereto, said inner duct means having a plurality of first openings therein, said outer duct means having a plurality of second openings therein, each of said first openings being aligned with a cooperating second opening in the outer duct means, a boss means connected to said inner duct at the location of each first opening and extending outwardly towards said outer duct, each boss means having an open-ended chamber extending from each of the first openings in the inner duct means for the length of the boss means, third opening means in each boss means extend from the interior of said outer duct means to the interior of each chamber, each of said bosses being aligned with the cooperating second opening of its first opening so that both the fuel from the inner duct means and the gas from the outer duct means will be directed through the open-ended chamber into the burner, the area of the third opening means in each boss means being greater than the area of the chamber so that the chamber will have a pressure approaching that of the gas in the outer duct.

2. A combination as set forth in claim 1 wherein each chamber is enlarged from a point adjacent the end of the boss means attached to the inner duct to the other end of the boss means.

3. A combination as set forth in claim 1 wherein a splash plate is placed in alignment with and spaced from each second opening in the outer duct means to provide for atomization and control of penetration.

4. A combination as set forth in claim 1 wherein said dual manifold is annular.

5. A combination as set forth in claim 1 wherein each boss means projects into the cooperating aligned second opening.

6. A combination as set forth in claim 1 wherein said third opening means extend into the interior of its associated chamber adjacent the end of said chamber where it is connected to said first opening.

7. A combination as set forth in claim 5 wherein said second opening is larger than said boss means to permit movement due to thermal changes.

8. In combination, a burner, fuel injection means in said burner, said fuel injection means including a dual manifold, said dual manifold comprising an outer duct means and an inner duct means therein, said inner duct means having a liquid fuel directed thereto, said outer duct means having a gas directed thereto, said inner duct means having a plurality of first openings therein, said outer duct means having a plurality of second openings therein, each of said first openings being aligned with a cooperating second opening in the outer duct means, a boss means connected to said inner duct at the location of each first opening and extending outwardly towards said outer duct, each boss means having an open-ended chamber extending from each of the first openings in the inner duct means for the length of the boss means, third opening means in each boss means extend from the interior of said outer duct means to the interior of each chamber, each of said bosses being aligned with the cooperating second opening of its first opening so that both the fuel from the inner duct means and the gas from the outer duct means will be directed through the open-ended chamber into the burner, each boss means projecting into the cooperating aligned second opening, each boss means having a cylindrical flange contacting the inner surface of the outer duct means.

References Cited

UNITED STATES PATENTS

| | | | |
|---|---|---|---|
| 2,734,341 | 2/1956 | Lovesey | 60—39.74 R |
| 2,861,424 | 11/1958 | Jurisich | 60—39.74 R |
| 2,946,185 | 7/1960 | Bayer | 60—39.74 R |
| 2,967,394 | 1/1961 | Jensen | 60—39.74 R |
| 3,046,731 | 7/1962 | Cambel | 60—39.74 R |
| 3,048,014 | 8/1962 | Schmidt | 60—39.74 R |
| 3,455,108 | 7/1969 | Clare | 60—39.72 R |

DOUGLAS HART, Primary Examiner

U.S. Cl. X.R.

60—261; 239—429; 431—354